A. B. COWLES & O. A. HANFORD.
WRAPPING MACHINE.
APPLICATION FILED JUNE 28, 1909.

986,548.

Patented Mar. 14, 1911.
10 SHEETS—SHEET 6.

WITNESSES:
Clarence W. Carroll
W. Gurnee

INVENTORS:
Arthur B. Cowles
and Orrin A. Hanford
by Ogard & Davis
their attorneys

FIG. 13.

A. B. COWLES & O. A. HANFORD.
WRAPPING MACHINE.
APPLICATION FILED JUNE 28, 1909.

986,548.

Patented Mar. 14, 1911.
10 SHEETS—SHEET 10.

WITNESSES:
Clarence W. Carroll
D. Gurnee

INVENTORS:
Arthur B. Cowles
and Orin A. Hanford
by Osgood & Davis
their attorneys

UNITED STATES PATENT OFFICE.

ARTHUR B. COWLES AND ORIN A. HANFORD, OF ROCHESTER, NEW YORK, ASSIGNORS TO ROCHESTER WRAPPING MACHINE COMPANY, OF ROCHESTER, NEW YORK, A CORPORATION OF NEW YORK.

WRAPPING-MACHINE.

986,548.   Specification of Letters Patent.   Patented Mar. 14, 1911.

Application filed June 28, 1909.  Serial No. 504,850.

*To all whom it may concern:*

Be it known that we, ARTHUR B. COWLES and ORIN A. HANFORD, citizens of the United States, and residents of Rochester, in the county of Monroe and State of New York, have invented certain new and useful Improvements in Wrapping-Machines, of which the following is a specification.

This invention relates to wrapping machines.

The object of the invention is to provide a machine that will receive wrapping paper from a roll, fold it around articles of uniform size that are fed to the machine, glue the wrapper, and deliver the wrapped package, all by automatic mechanism.

Figure 1:
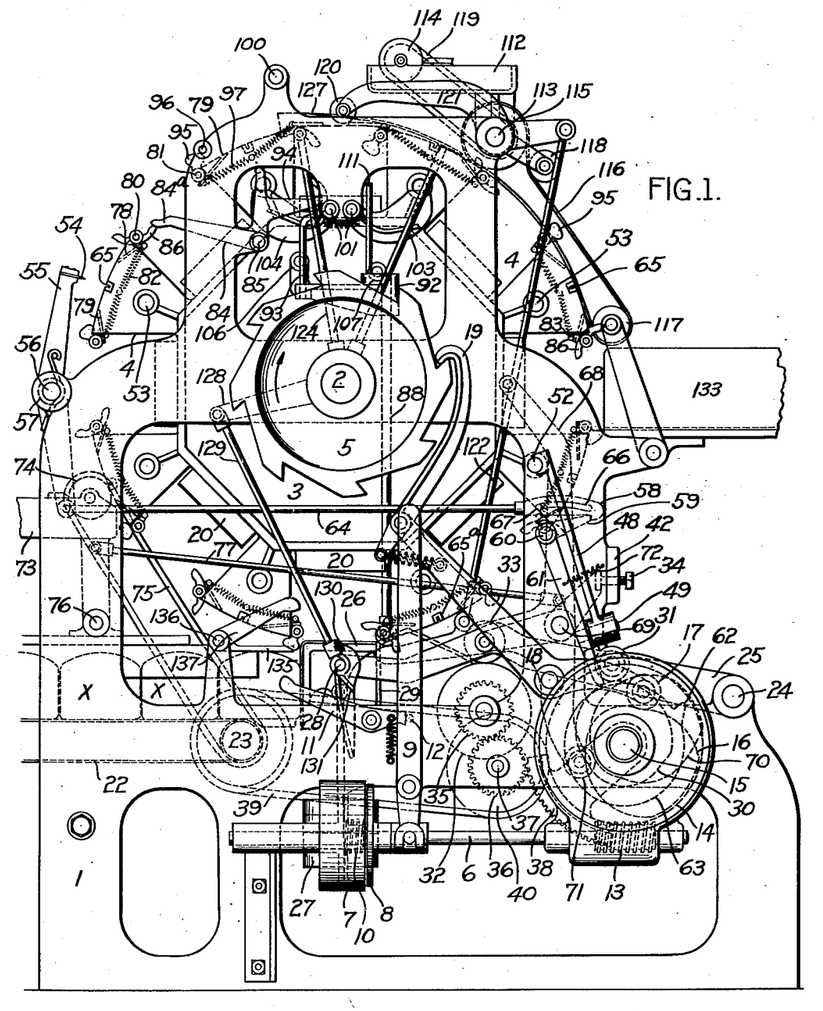
—Figure 1 is a side elevation of the complete machine.

The machine illustrated in the drawings has two side frames, 1, 1 (Fig. 1), which rest upon the floor. Said frames support revolubly a shaft 2, to which a drum 3 is fixed that is adapted to contain the packages to be wrapped, in pockets 4 in its periphery.

On one end of the shaft 2, outside of the frame 1, is a ratchet disk 5. Near the bottom of the frame 1, and parallel with it, is a shaft 6 that is driven by a pulley 7. Said pulley is connected to said shaft by a friction clutch 8 that may be controlled by a hand lever 9. A spring 10 normally tends to disengage said clutch from said pulley, but may be prevented from doing so by a latch 11 that engages a pin 12 on the lever 9. At the opposite end of the shaft 6 from the pulley 7 is a worm 13 that engages a worm wheel 14 upon a transverse shaft 15. The latter carries several cams for operating various parts of the machine in the proper sequence. The first cam, 16, engages a roller 17 upon the end of a pivoted arm 18, while the upper end of the latter carries a pawl 19 that engages with the ratchet disk 5. As the shaft 6 revolves, the action of the worm 13 against the worm wheel 14 turns the shaft 15 in the direction indicated by the arrow, and at every revolution of the latter, the cam 16 tilts the lever 18 about its pivot so that the pawl 19 turns the ratchet disk 5 to the extent of one tooth, thereby moving the drum 3 a corresponding distance. In the construction shown in the drawings, eight revolutions of the shaft 15 cause one revolution of the shaft 2.

Figure 3:
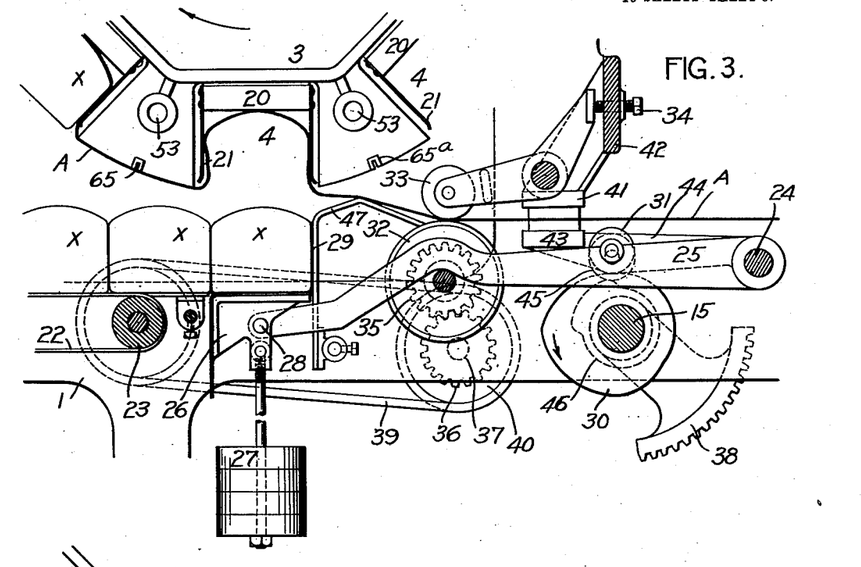
Fig. 3 is a side elevation of the paper-feeding and package-feeding mechanism in one position.
Figure 4:
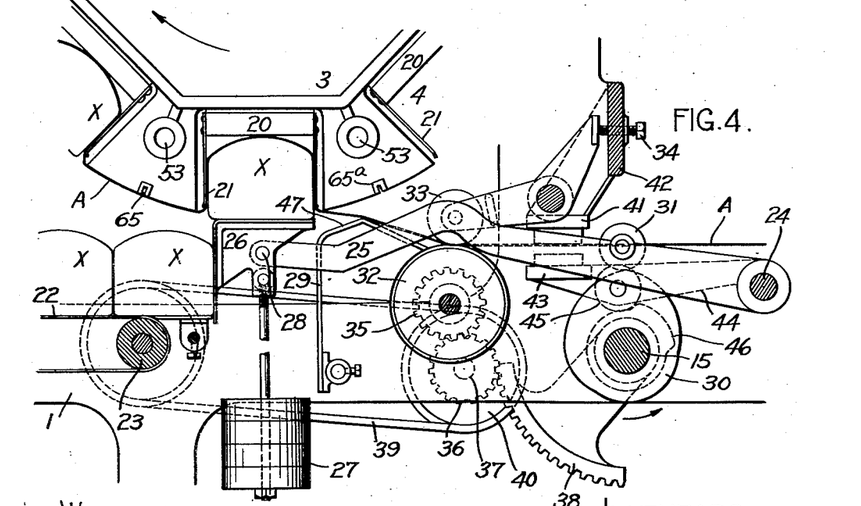
Fig. 4 shows the same parts as Fig. 3, in another position.

The pockets 4 in the periphery of the drum 3 each have at their inner ends a block 20, preferably of wood, to which are attached on either side spring clips 21, 21 (Figs. 3 and 4). Said clips are adapted to retain yieldingly the package that is to be wrapped while the drum 3 is revolved.

The machine shown is specially adapted for wrapping loaves of bread. These are fed along a belt or flexible carrier 22 (see Figs. 3 and 4) that runs over a pulley 23, the loaves being indicated in the drawings by the letters X, X, etc.

Pivoted to the frame 1 at 24 is an arm 25, which carries on its end a plunger or table 26. The table is maintained in its horizontal position by a weight 27 hanging from it, and is pivoted at 28 in the end of said arm. In the normal position of the arm 25 (Fig. 3), the top of the table 26 is in line with the top of the belt 22, so that a loaf of bread passes onto it from the belt and comes to rest against an abutment 29. As the shaft 15 revolves, a cam 30 on it acts against a roller 31, that is carried on the lever 25 between the table 26 and its pivot 24, and swings the arm 25 upward, so that the loaf of bread X that rests upon the table 26 is forced between the springs 21 of that pocket 4 that is directly over it, till it comes in contact with the block 20 at the bottom of said pocket. During this movement the roller 17 rests on a "dwell" on the cam 16, and the drum 3 is at rest with the pocket that is being filled in the vertical plane through the shaft 2, in which position it remains until the table 26 again begins to move downward.

The paper for wrapping the bread is fed in a strip A, that is drawn from a roll (not shown in the drawings) by means of a roller 32, so that it passes over the top of the loaf X that lies upon the table 26. The paper A is held tightly against the roller 32 by a pressure roll 33 that can be set up as required by a screw 34. For driving the paper-feeding roller 32, a gear 35 is attached to it that meshes with a similar gear 36 journaled on a stud 37, and the gear 36 is revolved intermittently by a segmental gear 38 that is fixed to the shaft 15. The feeding-belt 22 is represented as driven by a chain 39 that extends from a sprocket 40, fixed to the gear 36, to a sprocket connected with the pulley 23 which supports said feeding-belt. These parts are so timed that the feeding of the paper begins just before the table 26 begins to move upward, while the drum 3 is in motion, placing the paper in the pocket as shown in Fig. 3, the paper being forced into the pocket because it is fed while the parts are at rest in the position shown, and because it can go nowhere else. Obviously, the paper may not always go as far back into the pocket as shown in Fig. 3, and may not always lie as smoothly as there shown.

A stamp or embossing device may be used, if desired, to impress the paper just before it is fed into the machine. A device for this purpose is shown which consists of an abutment 41 that is fixed to a cross-frame 42, and which coöperates with a die 43 upon the end of an arm 44 that is supported on the pivot 24. A roller 45 on the arm 44 coöperates with a cam 46, which is so timed with respect to the cam 30 and segmental gear 38 that the die 43 moves up against the abutment 41 and impresses the paper, and then begins to move downward just as the segmental gear 38 comes into engagement with the gear 36. A guard or stripper 47 lies against the feed roller 32, and guides the paper A up over the top of the bread X.

Figure 2:
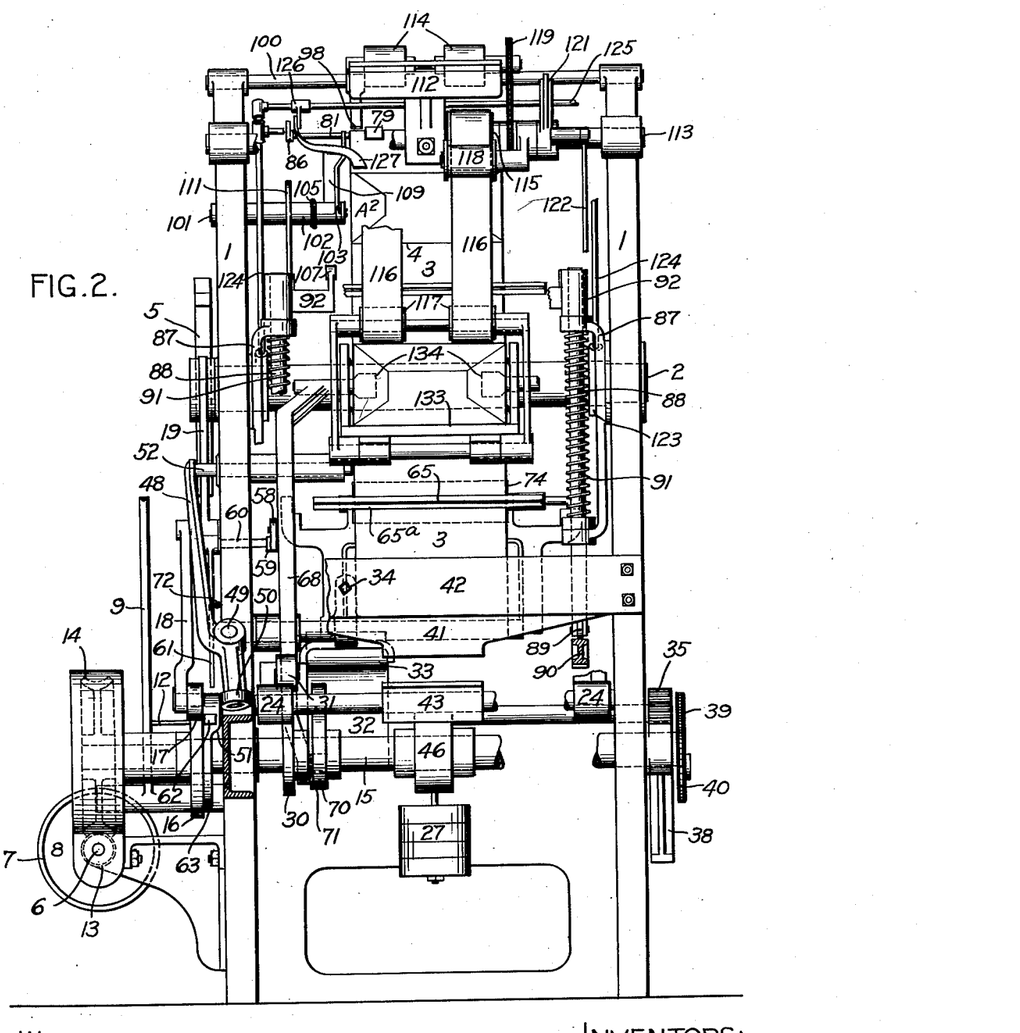
Fig. 2 is an end elevation thereof taken from the right hand side of Fig. 1, parts being broken away.

All of the mechanism for performing the folding operations perform their functions, which will be explained in detail, while the drum 3 is stationary. A positive lock is provided to hold said drum 3 stationary during these operations, and to release it when required, which consists of a lever 48 (Fig. 2) pivoted on the frame 1 at 49, and carrying a roller 50 at its lower end. A face cam 51 on the shaft 15 coöperates with said roller, swinging the lever 48 about its pivot 49 when the drum 3 is at rest until it pushes a rod 52 into one of the holes 53 in the drum, one of which is located between every two pockets 4 (Figs. 3 and 4).

Figure 8:
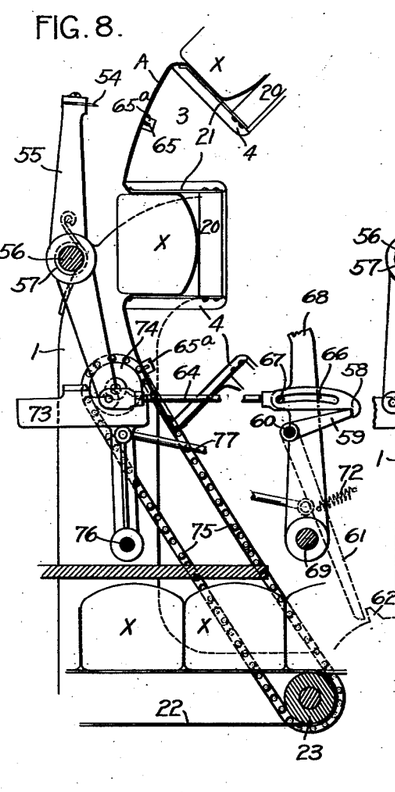
Fig. 8 is a side elevation of the cutting-off mechanism and the gluing mechanism first employed, in one position.
Figure 9:
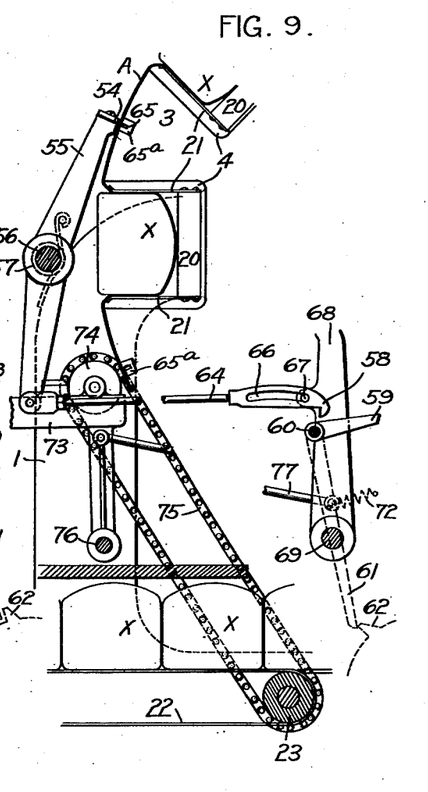
Fig. 9 shows the same parts in another position.
Figure 18:
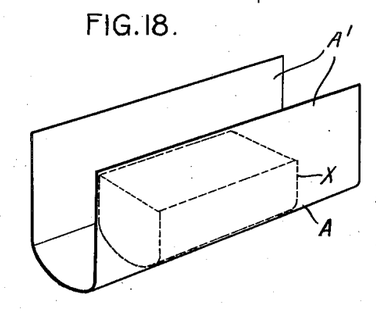
Figs. 18 to 21 show the package in the successive stages of wrapping.

To sever the paper A at the proper point to prepare it for the first folding operation, a knife 54 is provided (Figs. 1, 8 and 9), which is fixed to the upper end of a lever 55 that is pivoted to a transverse shaft 56. A spring 57 is coiled about the latter, and tends to throw the upper end of said lever, and accordingly the knife 54, against the periphery of the drum 3, but is restrained from doing so by a suitable latch mechanism that is automatically released at the proper moment. This latch mechanism consists of a hook 58 that engages an arm 59 fixed to a shaft 60 that extends through one of the side frames 1. On the shaft 60 is a depending arm 61 that is adapted to be struck by a lug 62 that projects from a disk 63 on the shaft 15. The hook 58 is connected by a rod 64 with the lower end of the lever 55. When the lug 62 strikes the arm 61, it moves the arm 59 out of engagement with the hook 58, and the spring 57 throws the upper end of the lever 55 toward the drum 3, so that the knife 54 coöperating with a notch 65 in a bar 65ª in the drum 3, when the latter is stationary, cuts off the paper. A curved slot 66 in the hook 58 coöperates with a pin 67 that projects from one of the levers 68, a pair of which are pivoted on a transverse shaft 69 (see Figs. 13 and 14). The levers 68 are moved in unison about the pivot 69 by means of cams 70 that are fixed upon the cam shaft 15, and engage rollers 71 on the lower ends of said levers. After the knife 54 has been swung against the drum 3 by the spring 57, the pin 67 lies at the outer end of the slot 66. When the levers 68 are swung by the cams 70 (Fig. 14), the pin 67 (on one lever only) pulls the hook 58 with it, and thus returns the knife 54 and the lever 55 to the position shown in Fig. 8. When the levers 68 have reached the extremity of their movement, the arm 59 is carried into engagement with the hook 58 again by means of a spring 72. After the paper is cut, the package appears as shown in Fig. 18. The knife and its mechanism are so located in the machine shown in the drawings that the pocket after receiving a loaf of bread turns through another position and into a third before the paper is severed preparatory to wrapping it around the loaf (Figs. 8 and 9).

Figure 12:
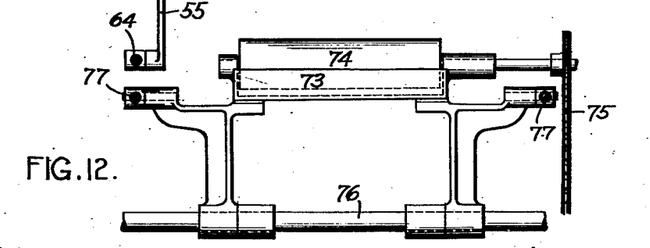
Fig. 12 is an end view of the gluing mechanism shown in Fig. 8.

Mechanism is provided for placing glue on part of the paper A where it can be stuck to another part when the two parts are folded together. This gluing mechanism is illustrated in Figs. 8, 9 and 12, and consists of a reservoir 73 in which a roller 74 is rotatably supported. The latter is intermittently rotated by a chain 75 that runs over a sprocket on the pulley 23 (which, as previously explained, also operates the belt for feeding the rolls to the machine, and is operated by the segment 38, as has also been explained). The reservoir 73 is supported upon a cross-shaft 76 and at some distance above it. A rod 77 is attached to said reservoir at one end, and at its other end to the lever 68 a short distance above the pivot 69. When said lever 68 is in its normal position (Fig. 13), the roller 74 is not in contact with the paper upon the periphery of the drum 3, but as said lever is swung outward to reset the knife, as explained above (Fig. 14), by the action of the cam 70, the rod 77 moves the reservoir 73, and therefore the roller 74, toward the drum 3, and said roller strikes the paper A across its entire width, thus depositing a narrow line of glue upon it. This last described mechanism also operates during the time that the drum 3 is stationary.

The first and second wrapping operations are illustrated in Figs. 5, 6, 10 and 11, and in the machine shown in the drawings occur when the pocket with the paper and loaf of bread is in its fourth and fifth positions. The function of the first folding mechanism is to turn down those parts of the paper that lie, respectively, on each side of the pocket between it and the notch 65 at which the paper has been cut; while the function of the second folding mechanism is to turn over the bottom and tuck in at the ends of the package the side pieces that project beyond the drum.

Figure 10:
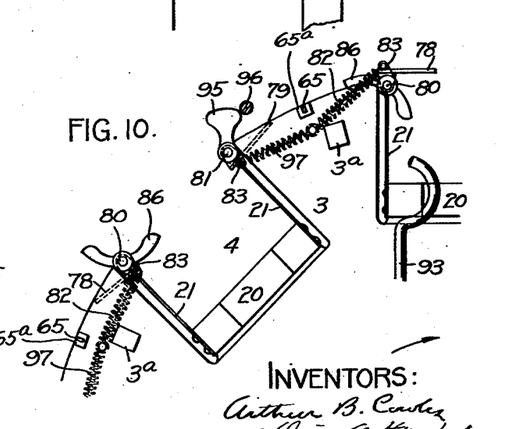
Fig. 10 is a side view of the mechanism employed for the first folding operation.
Figure 11:
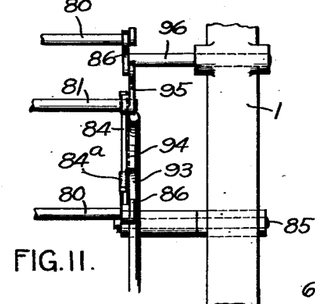
Fig. 11 is an end view of the same.

The first folders consist of flaps 78 and 79 that are fixed to shafts 80 and 81, respectively, on opposite sides of each of the pockets 4 at their upper edges (Fig. 10).

Figure 5:
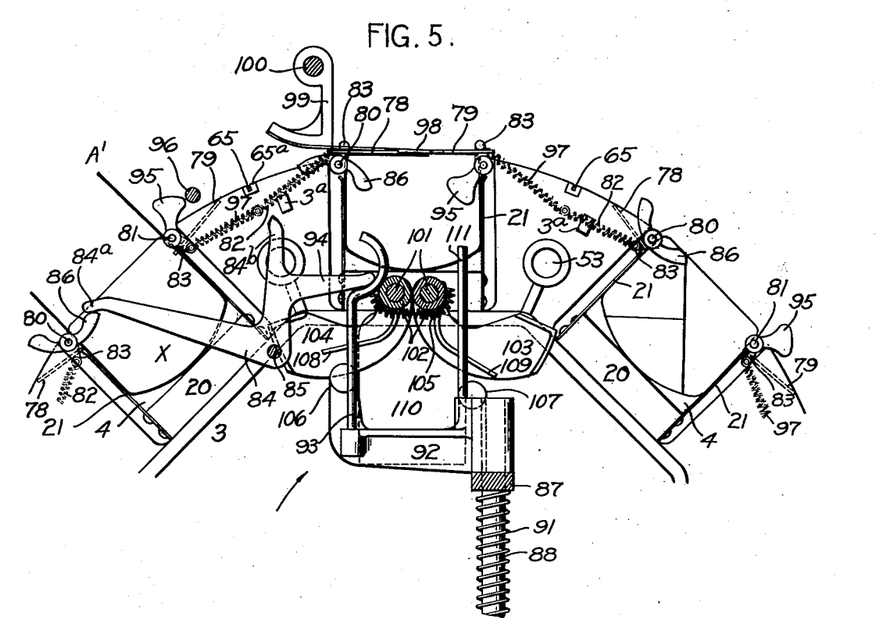
Figs. 5 and 6 show the wrapping mechanisms employed for the first and second operations, in their inoperative and operative positions, respectively.
Figure 6:
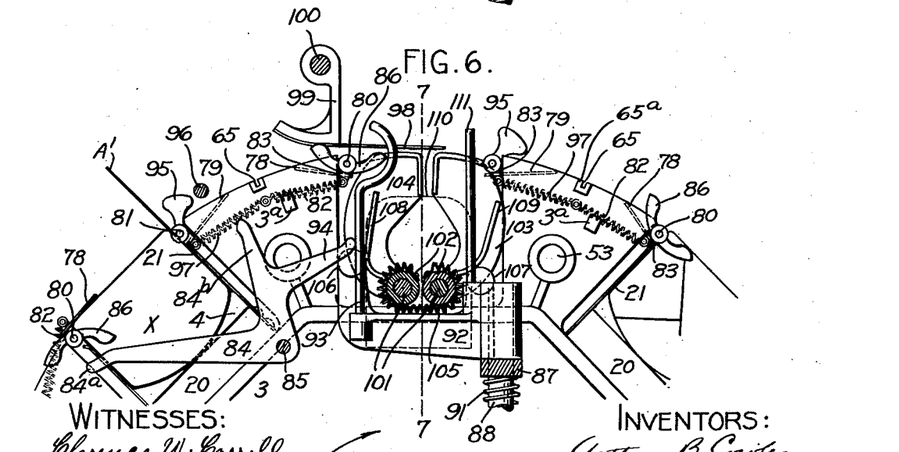
Figure 7:
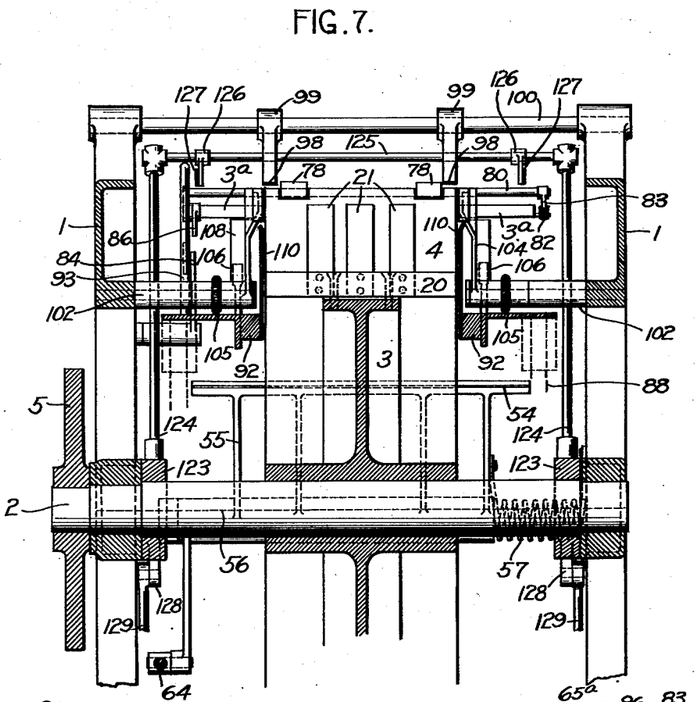
Fig. 7 is a vertical cross-section on the line 7—7 of Fig. 6.
Figure 14:
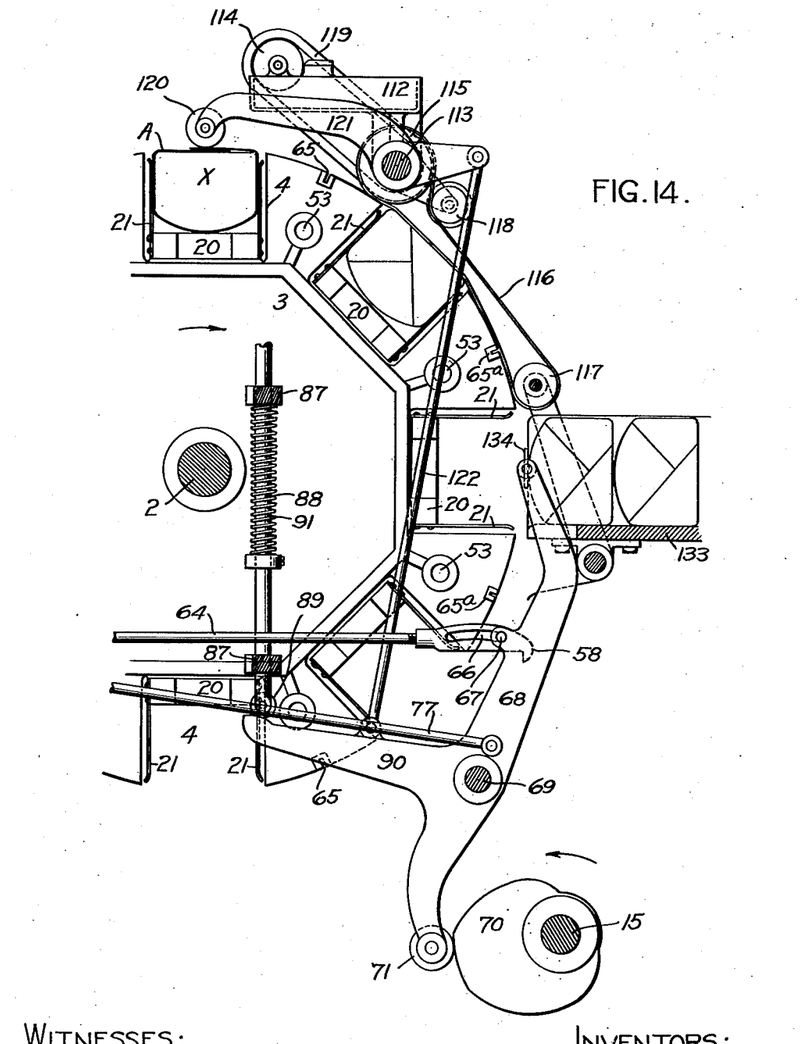
Fig. 14 shows the same parts in operative position.

Turning first to the operation of flaps 78, it is seen that they are normally held away from the pockets and within the periphery of the drum 3 (Fig. 7) by the action of springs 82 that push against arms 83 on said shaft 80, and that they are operated by a lever 84 that is pivoted to the frame 1 at 85. The outer end 84ª of said lever strikes a dog 86 fixed to the end of the shaft 80 when the lever is tilted about the pivot 85. The mechanism for accomplishing the tilting of the lever is as follows: Supported in guides 87 on the inside of the frames 1 are rods 88, carrying at their lower ends rollers 89 (Fig. 2) that bear against an arm 90 that projects from the lever 68 (Fig. 14). Said rods are continuously forced downward by coiled springs 91, so that the rollers 89 are maintained in contact with the arms 90. On the upper ends of the rods 88 are blocks 92, and one of these blocks supports a hook-shaped post 93 (Fig. 5). When the lever 68 is swung outwardly, as before described, to reset the knife and deposit glue across the paper by the cam 70, its arm 90 carries the rods 88 upwardly so that the hook portion of the post 93 strikes a projecting arm 94 on the lever 84 and tilts it about the pivot 85. This swings the dog 86, and turns the shaft 80 part way around in the direction indicated by the arrow in Fig. 5. As soon as the end of the arm 83 has passed the center of the shaft 80, the spring 82 throws the flap to its limit of movement, where it strikes the bottom of the loaf of bread contained in the pocket 4. Said flap carries with it the loose end of the paper A, and turns it down against the bread, the pressure of the spring 82 maintaining it in that position. The lever 68 is then returned to its normal position, thereby permitting the springs 91 to retract the blocks 92 and the hook 93.

Figure 19:
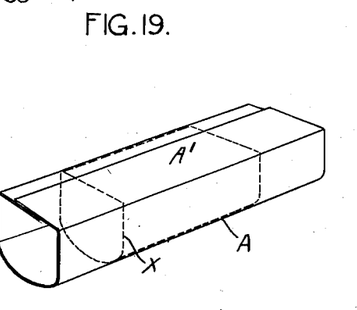

After the flap 78 has folded in one side of the paper, the pawl 19 begins to move the drum 3, and as soon as it moves, a dog 95 upon the shaft 81 strikes a pin 96 that projects inwardly from the frame 1 (Fig. 11), and swings forwardly the flaps 79. Springs 97 throw said flaps downward against the bread, carrying with them the portion A' of the paper shown in Fig. 5, and pressing its glue covered portion upon the flap that has already been turned down. The drum thus moves one-eighth of a revolution, and comes to rest again with the center of the pocket 4 directly above the shaft 2. As the drum rotates, the lever 84 is tilted backward by lugs 3ª on the drum 3 that strikes an extension 84ᵇ on said lever. In the position last mentioned, a pair of flat springs 98 that are fixed to castings 99 on a transverse bar 100 press upon the overlapping portions of the paper and maintain them in contact. Fig. 19 shows the package as it now appears.

The second folding operation, together with the resetting of the flaps 78 and 79, occurs upon the next upward movements of the rods 88. Extending inwardly from the frames 1 are studs 101 that carry sleeves 102. To said sleeves are fixed blades 103, 104, that are adapted to fold inwardly the sides of the paper that project beyond the lateral faces of the drum 3. Said blades are normally turned downward, as shown in Fig. 5, by the tension of a spring 105 that is fastened at each end to the sleeves 102, but they are carried upwardly and moved toward each other by lugs 106 and 107 that strike projecting ribs 108 and 109, on said blades, respectively, when the lever 68 is tilted to the position shown in Fig. 14. On the inside of the blocks 92 are plates 110 that lie close to the sides of the drum 3. These plates strike the bottom of the projecting ends of the folded paper, and turn these ends upwardly against the ends of the loaf of bread before the blades 103 and 104 are moved sufficiently to carry the side portions inwardly. Therefore, the side portions of the paper are not completely folded until the bottom is tucked in. The blade 104 completes its movement a little in advance of the blade 103, so that the side tucks may overlap.

When the block 92 has reached nearly its upward limit of movement, the upper end of the hook post 93 strikes the dog 86, and the upper end of a straight post 111 strikes the dog 95. Both of said dogs are thereby tilted toward the sides of the pocket 4, and as soon as the springs attached thereto pass the central point, the action of the latter returns the flaps 78 and 79 to the normal position.

Figure 13:
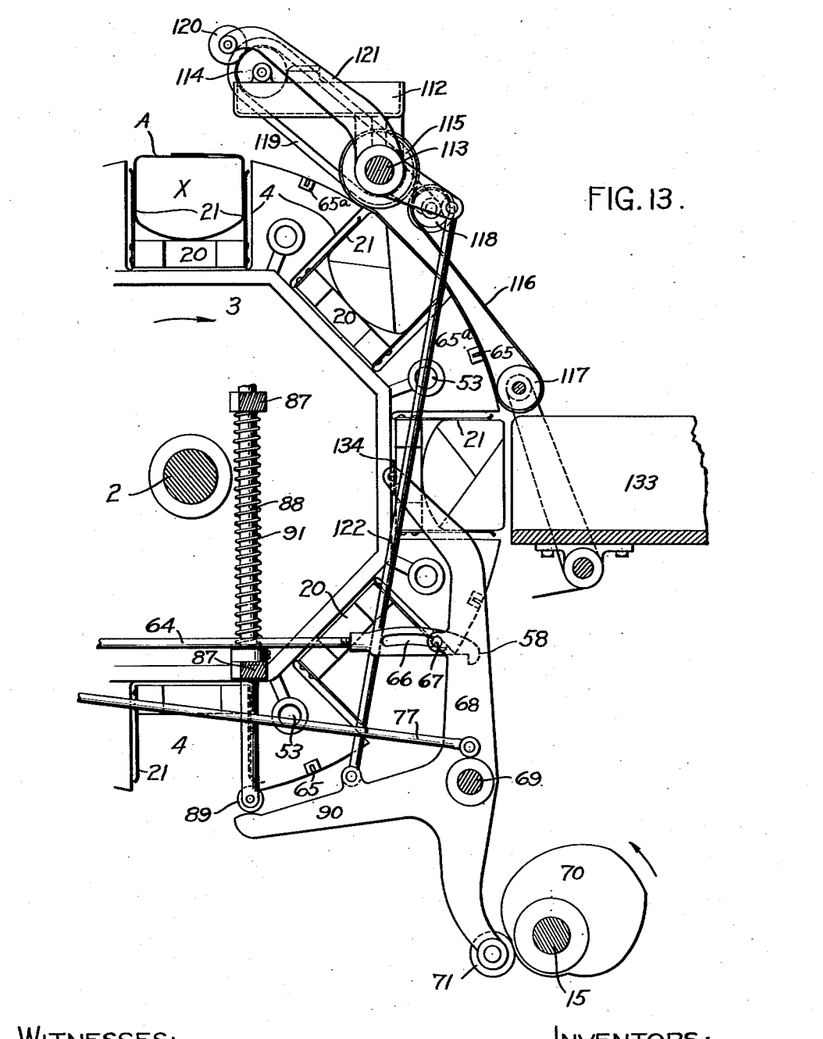
Fig. 13 is a side view of the mechanism for operating the second set of wrappers, the cutting-off mechanism, the second gluing mechanism and the package discharger, in normal position.
Figure 20:
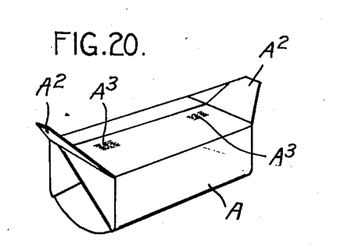
Figure 21:
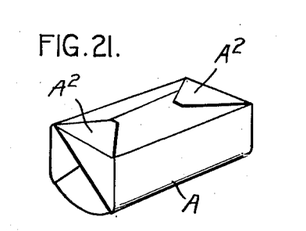

The condition of the package at this time is represented in Fig. 20. It will be observed that by turning in the bottom and sides of the projecting ends of the wrapper, its top portions $A^2$ that still project beyond the ends of the loaf are caused to tilt upwardly. The only operation necessary to complete the wrapping is to apply glue to the top of the package and then turn these ends $A^2$ back upon said glue. The mechanism for applying the glue is shown in Figs. 13 and 14. A glue-reservoir 112 is fixed to a nonrevoluble rod 113 that is supported in the frames 1, 1, and said reservoir has a roller 114. A pulley 115, loose upon the rod 113, is revolved by the friction of a belt 116 against the periphery of the drum 3, another function of said belt being to retain the completed package in the pocket 4 until ready for ejection. The lower loop of the belt 116 is hung on a pulley 117, and an idler 118 may be used to maintain a proper tension. A sprocket on the pulley 115 carries a chain 119 that connects with the glue-roller 114. The latter is thus revolved whenever the drum 3 moves, and so always has a fresh supply of glue upon its surface. A pair of short rollers 120 are hung in the ends of arms 121 that are pivoted on the rod 113. The outer ends of said arms are connected by rods 122 with the arms 90° of the levers 68. When the latter are in the normal position (while the drum 3 is in motion), the rollers 120 rest on the roller 114, and receive glue from it (Fig. 13). As the levers 68 move to the position shown in Fig. 14, the rods 122 are carried upwardly, and the arms 121 are swung downwardly, bringing the rollers 120 into contact with the top of the package near its ends, and depositing glue at the points indicated by $A^3$ in Fig. 20.

Figure 15:
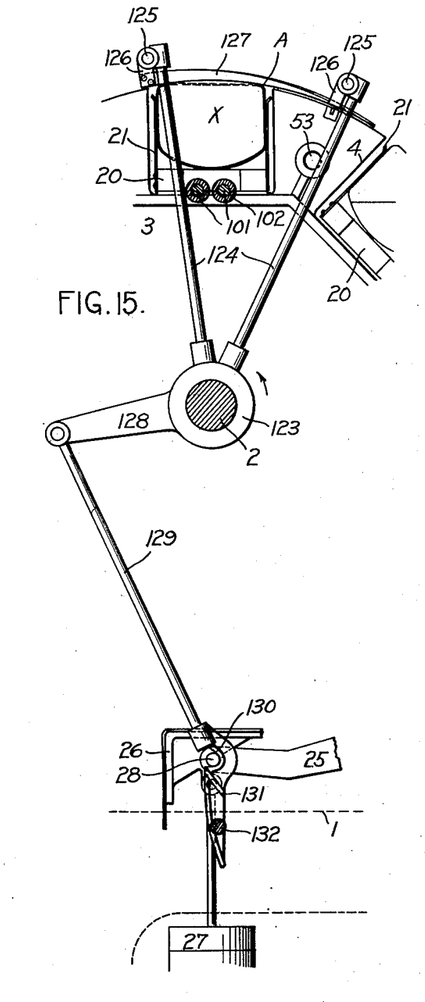
Fig. 15 is a side elevation of the last folding mechanism, in normal position.
Figure 16:
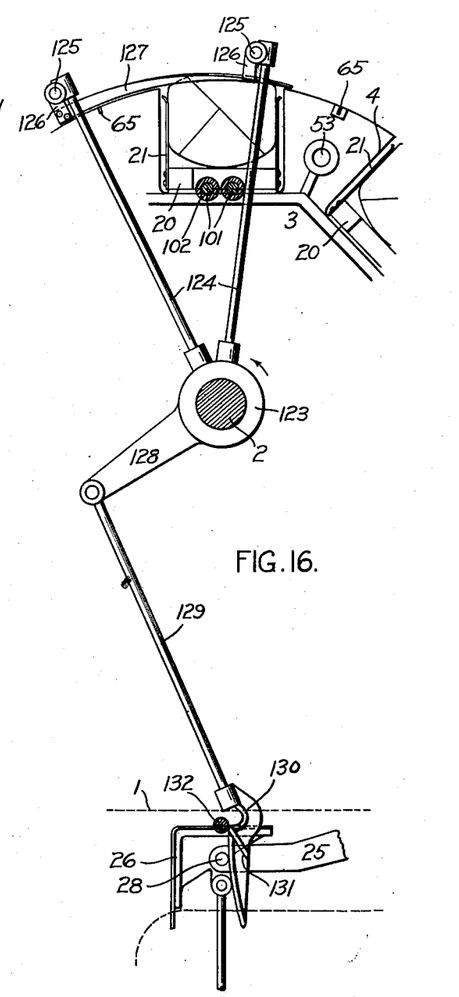
Fig. 16 shows the same in operative position.
Figure 17:
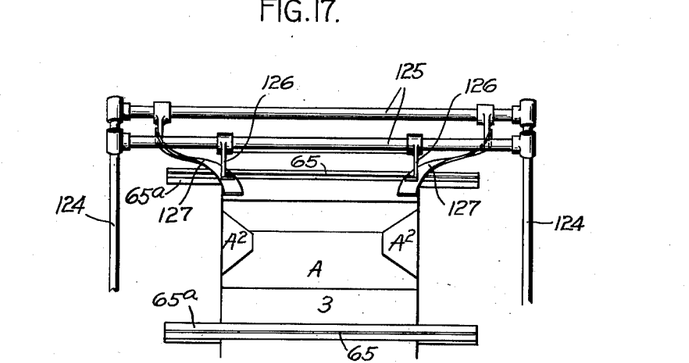
Fig. 17 is an end view of Fig. 15.

The mechanism for folding the ends $A^2$ down upon the glued top surface of the wrapper is shown in Figs. 7, 15, 16 and 17. On the shaft 2, just within each of the side-frames 1, 1, are loose collars 123. Rods 124, fixed to said collars, extend radially beyond the periphery of the drum 3, and are connected by crossbars 125. Lugs 126 are fixed to said crossbars, and carry twisted plates 127. The latter are vertical at one end (the left in Figs. 15 and 16), and horizontal at the other, said vertical portions being some distance from the sides of the drum, and the horizontal portions overlying it just within the sides (Fig. 17). On one of the collars 123, and extending toward the belt 22, is an arm 128, from which depends a rod 129 (Figs. 15 and 16). Said rod carries at its lower end a hook 130, on which is a beveled lug 131, that engages the pin 28 on the table 26 when the latter is elevated. When said table is lowered, the pin 28 pulls the hook 130 downward, and the collar 123 is swung as indicated by the arrow, carrying the plates 127 toward the left. The plates, as they move, slide under the partly-raised ends $A^2$ of the wrapper, and gradually push the latter inward and downward upon the glued top of the package. When the table 26 nearly reaches its lowermost position, the beveled lug 131 strikes a pin 132 on the frame 1, and is moved toward the right, out of engagement with the pin 28 (Fig. 16). The parts are carried back to the original positions when the drum 3 begins to move, by the friction of the plates 127 against its periphery. At the next succeeding movement of the drum 3, the package passes under the belt 116, which prevents it from falling out, and the final movement of the drum brings the package in line with a trough or delivery-chute 133, into which it is ejected. The latter action is accomplished by the levers 68 as they swing (Fig. 14), fingers 134 being provided at their upper ends to engage the package.

To stop the machine when the supply of loaves upon the belt 22 gives out, a safety device is provided which permits the spring 10 to release the clutch 8 from the pulley 7. This device consists of a plate 135 that is fixed to a stud 136 (Fig. 1), to which an arm 137 is also fixed. The plate 135 rests upon the top of the loaf of bread at the end of the belt 22, and when said loaf is passed upon the table 26, and there are no more following, said plate drops down, taking the arm 137 with it, strikes the lever 11, and raises the latter out of engagement with the pin 12. This releases the lever 9, and the spring 10 is then free to act. When the clutch is disengaged, the pulley 7 may continue to run, but the shaft 6 is not driven. In order to run out of the machine the loaves of bread contained in it when the last loaf passes from the belt 22 onto the table 26, the machine may be set in operation by operating the clutch by hand during the required time.

To recapitulate, all of the operations that are performed upon the loaf of bread after it has been deposited within the pocket and surrounded by paper cut to the right size, are controlled by the levers 68, with the exception of (1) folding in one side of the paper by the flap 79 (which is done by a stud on the frame when the drum rotates), and (2) turning down the final flap $A^2$ (which the table 26 accomplishes when moved down to its normal position by the weight attached to it). In other words, the levers 68 control the following functions, viz: (a) the deposit of glue across the uncut paper, (b) resetting of knife after cutting operation, (c) operating flap 78, (d) making a three end fold on each end of the loaf, (e) resetting flaps 78 and 79, (f) depositing glue for flaps $A^2$, and (g) ejection of completed package. All of these operations are accomplished by positive action of said lever 68. The lever 68 is operated intermittently during the periods of rest of the drum by the cam 70, and is returned by springs 91. In addition to cam 70 there are the following parts on the operating shaft 15 for the following functions, respectively, namely, (1) cam 16 which rotates the drum, (2) cam 46 which stamps the paper, (3) disk 63 with its lug for tripping the knife, (4) cam face 51 for operating locking bar 52, and (5) segmental gear 38 for operating the feeding mechanism of both bread and paper, and accomplishes the intermittent rotation of first glue roll. The only other means besides the lever 68 and the parts last mentioned, that are employed to operate any of the mechanism are (a) the lugs $3^a$ for resetting lever 84, and (b) studs 28 for rocking the curved folding plates 127. Thus, all these several moving parts which for their operation require pressure delivered in some cases radially, with respect to the drum, and in others circumferentially, are actuated by one arm or the other of the bell-crank lever 68, with the exception of those folding operations that occur last in order, and for these circumferential, and radially operating movement is found in the movement of the drum itself and the feeding table.

What we claim is:—

1. In a wrapping machine, the combination with a rotary drum having peripheral pockets for the articles to be wrapped, of side folders pivoted on stationary shafts located on opposite sides of each pocket at its upper edge adapted to swing in over said pockets; means operating in definite positions of the drum for swinging the folders inwardly into the pocket; and means operating in subsequent definite positions of the drum for returning the folders to their initial positions; substantially as shown and described.

2. In a wrapping machine, the combination with a rotary drum having peripheral pockets for the articles to be wrapped, of side folders pivoted, respectively, at the sides of said pockets, adapted to swing in over said pockets, and having, respectively, operating arms attached to them; means operating in definite positions of the drum for swinging the folders inwardly into the pockets; and a part movable radially on the frame, and adapted in a subsequent position of the drum to engage the arms on said folders to reset them to their initial positions; substantially as shown and described.

3. In a wrapping machine, the combination with an intermittently rotating drum having peripheral pockets for the articles to be wrapped, of a spring-controlled side folder pivoted on each side of each pocket at the upper edge of the latter, adapted to swing over the pocket, each folder having attached to it an operating arm; means for operating the folders that are located on one side of the pockets, by engagement with their said arms, in one position of rest of the drum; and a stationary part attached to the frame, adapted to engage with said arms and thereby operate the folders that are located on the other side of the pockets, as the drum moves from its said position of rest; substantially as shown and described.

4. In a wrapping machine, the combination of a rotary drum having peripheral pockets for the articles that are to be wrapped; side-folding-flaps 78 and 79 pivoted, respectively, at the sides of said pockets, and having, respectively, operating arms attached to them; and springs adapted both to hold said folding-flaps down upon the package and to hold them in their inoperative positions back against the drum; substantially as shown and described.

5. In a wrapping machine, the combination of a rotary drum having peripheral pockets for the articles that are to be wrapped; side-folding-flaps 78 and 79 pivoted, respectively, at the sides of said pockets, and having, respectively, operating arms attached to them; a stationary support on the frame; a crank lever 84 pivoted to said stationary support, and adapted in one position of the drum to engage the arms on said folding-flaps 78; an intermittently-operated, reciprocating head adapted to operate said lever 84; and means for operating said folding-flaps 79; substantially as shown and described.

6. In a wrapping machine, the combination with a rotary carrier having pockets adapted to receive the wrapping paper and the articles to be wrapped, of a suitable stationary support on the frame; a pair of end-folding plates 103, 104, pivoted to said stationary support on each side of the carrier; curved, folding plates 127 supported above the carrier, and adapted to rock along its periphery to seal the flap formed by the plates 103, 104; and means for operating said folding devices in the order described; substantially as shown and described.

7. In a wrapping machine, the combination with a movable carrier having pockets open at each side and adapted to receive the wrapping paper and the articles to be wrapped, of a suitable support on the frame; a reciprocating part carrying a plate that is adapted to move back and forth across the open sides of the pockets successively to tuck in the bottom of the wrapper; a pair of end-folding plates pivoted to said stationary support on each side of the carrier, adapted to be operated by said reciprocating part to move upwardly and toward each other to fold in the ends of the wrapper after its bottom has been tucked in as aforesaid; and means for operating said folding devices in the order described; substantially as shown and described.

8. In a wrapping machine, the combination with a movable carrier having pockets adapted to receive the wrapping paper and the articles to be wrapped, of means for tucking in the bottom of the wrapper and folding in its ends; and twisted folding plates 127 supported above the carrier and adapted to move along the carrier to seal the flap formed by folding in the ends of the wrapper; substantially as shown and described.

9. In a wrapping machine, the combination of wrapping means for holding and applying a wrapper, and mechanism for elevating an article to be wrapped into coöperative relation with the wrapping means, said mechanism comprising an angularly-movable table-support, a table carried thereby and movably mounted thereon, the table being balanced on the support so as to remain always in horizontal position, and means for moving the table-support to carry the table vertically toward the wrapping means.

10. In a wrapping machine, the combination with a movable carrier having pockets adapted to receive the wrapping paper and articles to be wrapped, of means for placing the articles within the carrier with paper around them; side folders pivoted on each side of each pocket adapted to swing in over the pocket; a suitable stationary support; a pair of end-folding plates pivoted to said stationary support on each side of the carrier, adapted to move upwardly and toward each other; and an intermittently oscillating lever for operating one of the side folders in one position of a pocket and the end folders in a subsequent position of such pocket; substantially as shown and described.

ARTHUR B. COWLES.
ORIN A. HANFORD.

Witnesses for Arthur B. Cowles:
L. THON,
D. GURNEE.

Witnesses for Orin A. Hanford:
T. PAUL MCGANNON,
WALDO W. WILLARD.